E. H. Carpenter,
Hay Elevator,
Nº 52,676. Patented Feb. 20, 1866.
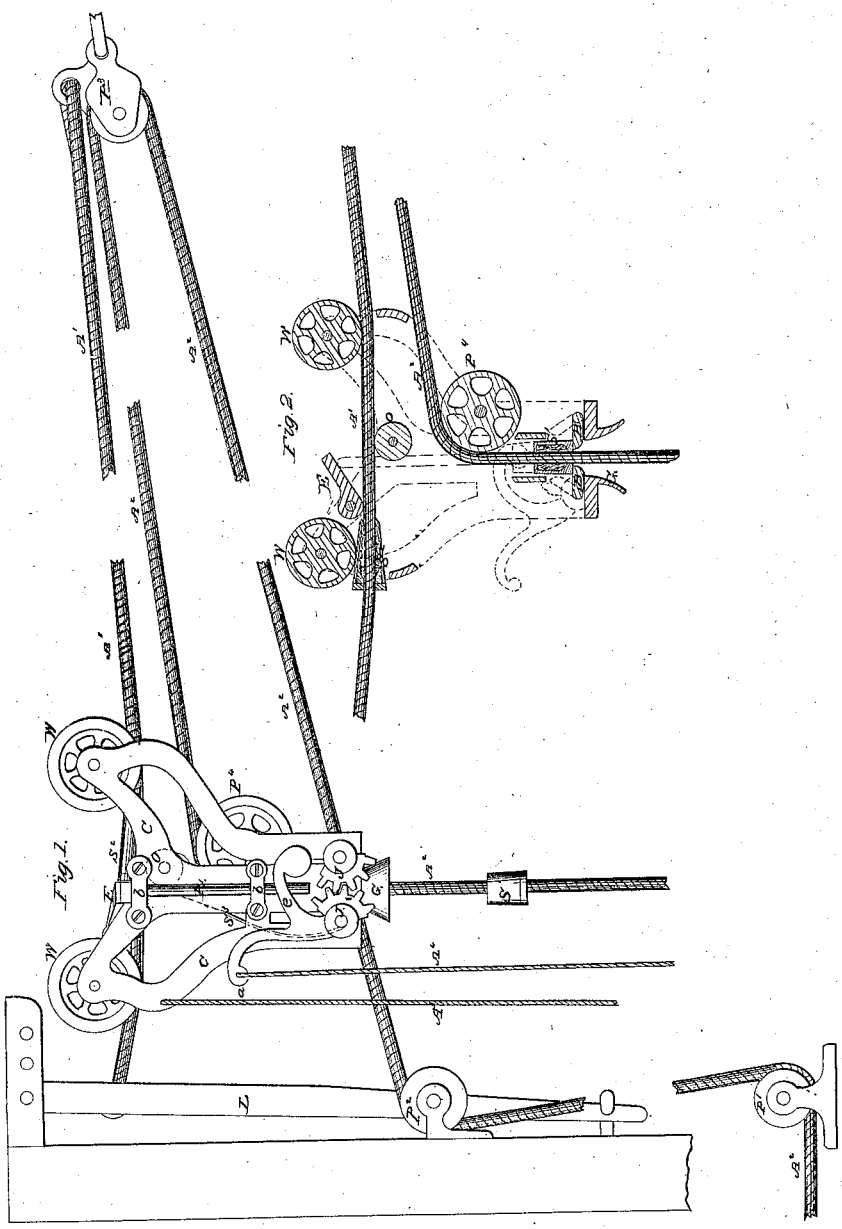
Witnesses:
A. V. Hyde
George Johnson
Inventor:
E. H. Carpenter

UNITED STATES PATENT OFFICE.

E. H. CARPENTER, OF DEXTER, MICHIGAN.

IMPROVEMENT IN TRACK-ROPE HAY ELEVATOR AND CARRIER.

Specification forming part of Letters Patent No. 52,676, dated February 20, 1866.

*To all whom it may concern:*

Be it known that I, EPHRAIM H. CARPENTER, of the town of Dexter, in the county of Washtenaw and State of Michigan, have invented a new and useful Hay Elevator and Carrier for elevating and transporting hay from the load into the mow, or other place of deposit; and I do hereby declare that the following is a full, clear, and exact description of the construction and operation of the same, reference being had to the annexed drawings, making a part of this specification, in which—

Figure 1 is a side elevation. Fig. 2 is a longitudinal vertical section.

Similar letters of reference indicate corresponding parts in both of the figures.

This invention consists in the use of a tight-rope track, and of a hoisting and conveying rope, in combination with a peculiar carriage, each of the ropes being fitted with an adjustable stop, and the several parts of the carriage operated and arranged in relation with each other, and with the said ropes, as hereinafter specified; and to enable others skilled in the art to construct and use my invention, I will now proceed to describe it.

A' represents the track-rope on which the hay-carriage travels. It is supposed to extend across the mow, near to and parallel with the ridge-pole of the barn, and as shown as broken off in the drawings, to indicate the deficiency, as represented, of proper proportionate length.

At the end nearest contiguous the entrance of the barn the rope A' is attached to a tightening-lever, L, and at the opposite end to the pulley-block $P^3$, which is fitted with a hook to connect it with the barn in such manner as to enable it to be readily moved from one place to another when it is desired to change the direction of the track.

C indicates one of the sides of the frame or casing of my track-rope hay-carriage, which casing carries two grooved track-wheels, W, a sheave-pulley, $P^4$, and has a bell-shaped guard, G, through which the draft-rope $A^2$ passes, and is furnished with other parts, which will be more briefly and best explained in describing the mode of operation.

The track and draft ropes are each provided with an adjustable quill-stop, the one on the draft-rope (marked S') I call the "elevating," and the one (marked $S^2$) on the track-rope the "carrying" stop. These stops are simply conical detached stuffing-boxes with screw-glands, in which a small selected portion of the rope is packed, with hemp or other suitable material, in the same manner as the rod of a steam-engine. This does not weaken the rope, and fastens the stop immovably to it when packed properly.

The rope $A^2$ passes from the draft-animal under pulley P' up to a suitable height, and over pulley $P^2$, thence to and around the pulley in the block $P^3$, and back over the carriage sheave-pulley $P^4$, from whence it passes down through the guard G to the loaded fork, which is not exhibited, as any of the known tilting kinds may be used with my arrangement without alteration.

The mode of operation is as follows: The track-rope A having been properly adjusted and tightened, and the carrying-stop $S^2$ fastened to the same in such a position as to place the carriage over the center of the hoisting place, the fork is run into the hay and the horse started up, as usual.

The loaded fork ascends into the mow until the elevating-stop, passing up through the guard G, strikes against two hinged seats, B B (which rest flat on the casing-bottom close to the rope) and lifts them up so as to allow the said stop to pass by, when the seats fall back to their first position and enables the stop to sustain the load while moving it horizontally to the mow. Just as the stop has cleared the seats it strikes against a bent end moving in a slot (not seen) of the tripping-rod R, which slides in guide-bearings *b b*, and lifts it up. The upper end of this rod is immediately under the side lip of a hinged catch, E, against which the carrying-stop $S^2$ abuts during the lifting of the load. When the tripping-rod lifts it carries up with it the catch, which allows the hay-carriage with its load to travel along the tight rope A to the proper locality in the mow, where the hay is unloaded by tripping over the fork in any of the usual ways.

The horse is now backed up, and the carriage and empty fork is run back by a rope, $A^3$, or in any other way, until the catch E slips over the carrying-stop, when the fork is lowered and the operation repeated until all the hay is transferred to the mow or other place of deposit.

To liberate the elevating-stops S', in order to permit the fork to be lowered, the operator must pull the rope $A^4$, which is attached to an arm, $a$, of one of the pair of quadrant-geared wheels, J, which are keyed on the overhang of the seat-spindles. This causes the seats to revolve sufficiently to allow the stop to pass through. On letting go the rope the seats fall back by the overpoise of the weighted arm $e$, or in place thereof an ordinary spring may be used, or the seats may be so constructed and arranged as to fall by their own gravity.

O represents a roller pivoted into the carriage-frame, which I employ to prevent the rope A sagging while elevating, and to furnish a bearing for the carrying-stop.

The use of the bell-shaped guard G is to prevent the draft-rope fraying when, from the sag of the track-rope A', the center line of the carriage is not vertical or in line with the loaded end of the draft-rope $A^2$.

I do not wish to confine the use of my arrangement, as described, to elevating and conveying hay into the hay-mow of a barn, as it is evident that it may be used anywhere that it is possible to find or construct adequate points of support for the track-rope.

I do not claim, broadly, elevating and conveying hay suspended from a carriage, as permanent central tracks have been used with wheel-carriages from which the suspended hay had to be swung laterally to its place.

What I claim, and desire to secure by Letters Patent, is—

1. The use of the track and draft ropes A' $A^2$, combined with the stops S' $S^2$, as and for the purposes specified.

2. The employment of said ropes and stops, in combination with a hay elevating and conveying carriage, constructed, arranged, and operated substantially as herein described.

E. H. CARPENTER.

Witnesses:
A. O. HYDE,
GEORGE JOHNSON.